(12) United States Patent
Maniktala

(10) Patent No.: US 9,812,903 B2
(45) Date of Patent: Nov. 7, 2017

(54) SYSTEM AND METHOD FOR WIRELESS POWER TRANSFER USING A TWO HALF-BRIDGE TO ONE FULL-BRIDGE SWITCHOVER

(71) Applicant: Integrated Device Technology, Inc., San Jose, CA (US)

(72) Inventor: Sanjaya Maniktala, Fremont, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 376 days.

(21) Appl. No.: 14/702,464

(22) Filed: May 1, 2015

(65) Prior Publication Data

US 2016/0072301 A1    Mar. 10, 2016

Related U.S. Application Data

(60) Provisional application No. 62/048,128, filed on Sep. 9, 2014.

(51) Int. Cl.
| | | |
|---|---|---|
| *H02J 7/00* | (2006.01) | |
| *H02J 17/00* | (2006.01) | |
| *H04B 5/00* | (2006.01) | |
| *H02J 50/40* | (2016.01) | |

(52) U.S. Cl.
CPC .............. *H02J 17/00* (2013.01); *H02J 50/40* (2016.02); *H04B 5/0037* (2013.01)

(58) Field of Classification Search
CPC .......... H02J 17/00; H02J 50/40; H04B 5/0037

USPC .......................................... 307/104; 320/108
See application file for complete search history.

(56) References Cited

U.S. PATENT DOCUMENTS

| | | | | |
|---|---|---|---|---|
| 8,217,621 | B2 * | 7/2012 | Tsai ........................ | H02J 7/025 320/108 |
| 8,963,371 | B2 * | 2/2015 | Kinnard .................. | H02J 9/061 307/64 |
| 2014/0132210 | A1 * | 5/2014 | Partovi .................... | H02J 7/025 320/108 |
| 2016/0301251 | A1 * | 10/2016 | Cho ........................ | H02J 50/90 |

\* cited by examiner

*Primary Examiner* — Dinh T Le

(74) *Attorney, Agent, or Firm* — Haynes and Boone, LLP

(57) ABSTRACT

A system and method of wireless power transfer using a two half-bridge to one full-bridge switchover includes a wireless power transfer system. The wireless power transfer system includes a controller, first and second transmitters coupled to the controller, the first and second transmitters being coupled to one another by an electrical connection, and a switch coupled between the electrical connection and a voltage rail. When the switch is closed, the controller operates the first and second transmitters in a two half-bridge mode. When the switch is open, the controller operates the first and second transmitters in a one full-bridge mode.

20 Claims, 6 Drawing Sheets

SYSTEM AND METHOD FOR WIRELESS POWER TRANSFER USING A TWO HALF-BRIDGE TO ONE FULL-BRIDGE SWITCHOVER

RELATED APPLICATIONS

The present application claims priority to U.S. Provisional Application Ser. No. 62/048,128, filed on Sep. 9, 2014, which is herein incorporated by reference in its entirety.

TECHNICAL FIELD

The present disclosure relates generally to wireless power transfer and more particularly to wireless power transfer using a two half-bridge to one full-bridge switchover.

BACKGROUND

Wireless power transfer offers a convenient technique for conveying electrical power without the use of traditional electrical cords. Among other advantages, wireless power transfer reduces safety hazards associated with cords, such as tripping and fire hazards, and improves aesthetics by reducing cord clutter. Still further, wireless power transfer is a low-hassle and cost-effective alternative to wired charging for portable electronics. For example, for portable electronics that are charged daily, wireless power transfer reduces the likelihood of misplacing wired chargers and prevents wear-and-tear associated with repeatedly plugging and unplugging the devices.

Accordingly, it would be desirable to provide improved wireless power transfer systems.

SUMMARY

Consistent with some embodiments, a wireless power transfer system includes a controller, first and second transmitters coupled to the controller, the first and second transmitters being coupled to one another by an electrical connection, and a switch coupled between the electrical connection and a voltage rail. When the switch is closed, the controller operates the first and second transmitters in a two half-bridge mode. When the switch is open, the controller operates the first and second transmitters in a one full-bridge mode.

Consistent with some embodiments, a wireless power transfer circuit includes a first resonant circuit configured for wireless power transfer, a first driver circuit configured to drive the first resonant circuit with a first drive signal, a second resonant circuit configured for wireless power transfer, a second driver circuit configured to drive the second resonant circuit with a second drive signal, an electrical connector coupling the first and second resonant circuits, and a switch coupled between the electrical connector and a first rail. The first and second drive signals have a first frequency, amplitude, and phase. When the switch is closed, the wireless power transfer circuit operates in a two half-bridge mode. When the switch is open, the wireless power transfer circuit operates in a one full-bridge mode.

Consistent with some embodiments, a method for switching between a two half-bridge mode and a one full-bridge mode during wireless power transfer includes, when switching to the two half-bridge mode, closing a switch coupled between an electrical connector between two wireless power transmitters and a ground node and independently controlling the two wireless power transmitters. When switching to the one full-bridge mode, the method further includes opening the switch, causing the two wireless power transmitters to operate as a combined transmitter, and synchronously controlling the combined transmitter.

In the figures, elements having the same designations have the same or similar functions.

DETAILED DESCRIPTION

In the following description, specific details are set forth describing some embodiments consistent with the present disclosure. It will be apparent to one skilled in the art, however, that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

The benefits of wireless power transfer, discussed previously, may be enhanced when a wireless power transmitter is configurable to concurrently transmit power to one or more receivers. For example, a wireless power transmitter may provide a charging pad on which either one large tablet computer or two small smartphones may be charged. Such a wireless power transmitter may include a pair of transmitting elements operated such that when charging a tablet computer, both of the transmitting elements send their combined power to the tablet computer, and when charging two smartphones, each transmitting element separately charges a corresponding smartphone. This configurability may allow users to charge a plurality of devices of varying size and type using a single wireless power transmitter. However, despite the added convenience of this configurability, conventional wireless power transmitters may not be designed to maximize the amount of power transferred in each of the one- and two-receiver configurations.

Figure 1A:
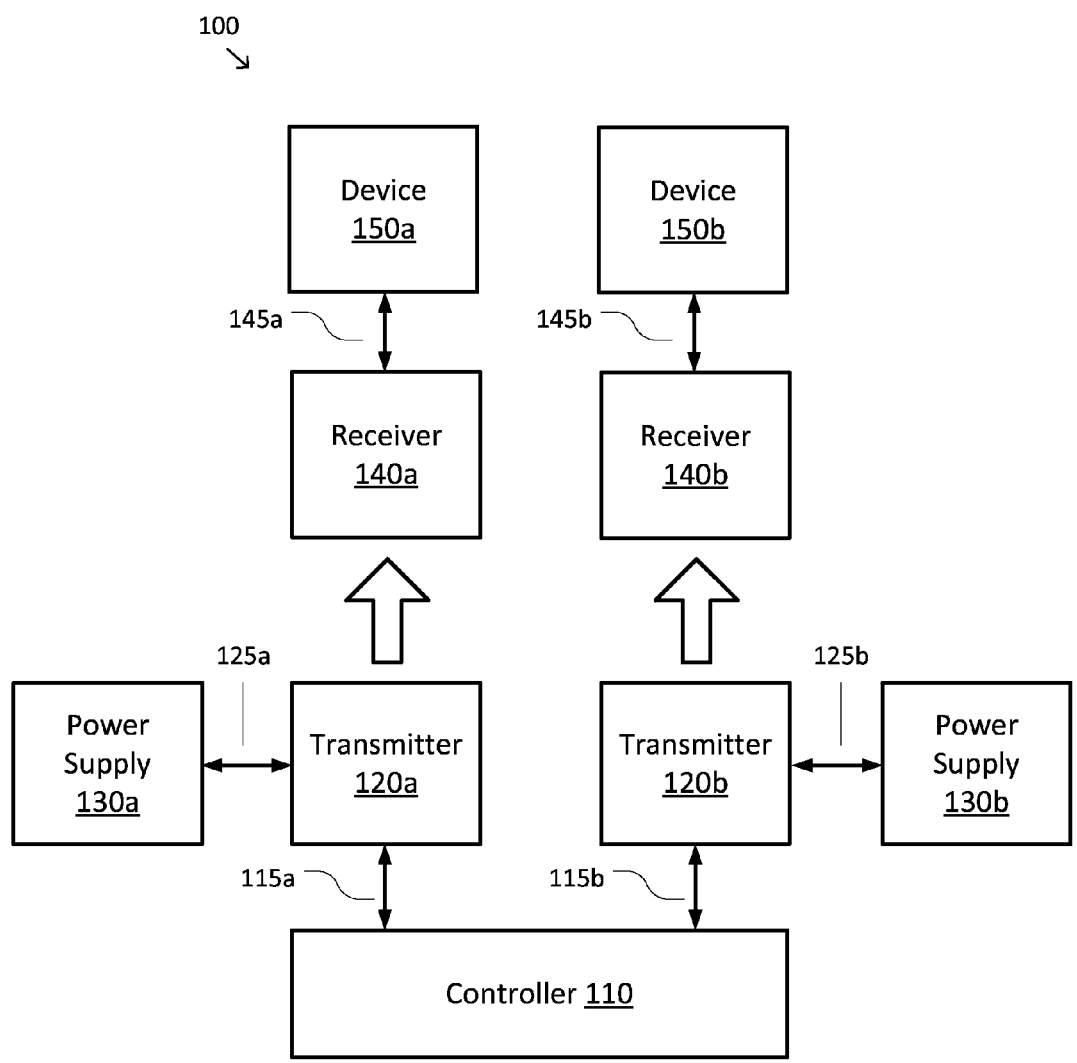
FIG. 1a is a simplified diagram of a wireless power transfer system in a two-receiver configuration according to some embodiments.

FIG. 1a is a simplified diagram of a wireless power transfer system 100 in a two-receiver configuration according to some embodiments. Wireless power transfer system 100 includes a controller 110 coupled via connections 115a and 115b to a pair of transmitters 120a and 120b. Transmitters 120a and 120b are further coupled via connections 125a and 125b to power supplies 130a and 130b. Transmitters 120a and 120b convert power from power supplies 130a and 130b into electromagnetic fields for wireless transmission. As depicted in FIG. 1a, a pair of receivers 130a and 130b receive the wirelessly transmitted power from transmitters 120a and 120b, respectively. Receivers 140a and 140b deliver the received power over connections 145a and 145b to a pair of devices 150a and 150b.

Controller 110 provides control signals to transmitters 120a and 120b. According to some embodiments, controller 110 may include one or more control circuits for generating the control signals. The one or more control circuits may include one or more analog, digital, and/or mixed signal integrated circuits, and may further include and/or interface with components providing additional functionality, such as a processor and memory, a display, a user interface, a communication module and/or the like. In some examples, controller 110 may include a demodulator for detecting backscattered communications from devices 150a and 150b, the communicated information being used to determine the desired characteristics of the transmitted power. In some examples, connections 115a and 115b may each include one or more electrical, optical and/or wireless links for conveying analog and/or digital control signals from controller 110 to transmitters 120a and 120b.

Power supplies 130a and 130b may supply direct current (DC) and/or alternating current (AC) power to transmitters 120a and 120b through connections 125a and 125b. When power supplies 130a and 130b are DC power supplies, connections 125a and 125b may include two or more rails at different voltage levels, such as a supply rail and/or a ground rail. A supply voltage of each of the transmitters 120a and 120b is determined based on the voltage difference between the supply rail and ground rail. Transmitters 120a and 120b convert power from power supplies 130a and 130b into electromagnetic fields for wireless transmission to receivers 140a and 140b. In general, the amount of transmitted power from each transmitter is proportional to the square of the supply voltage.

In some embodiments, transmitters 120a and 120b may be coupled by inductive coupling to receivers 140a and 140b, in which case transmitters 120a and 120b convert the power from power supplies 130a and 130b into time-varying magnetic fields. In some embodiments, transmitters 120a and 120b may be coupled by capacitive coupling to receivers 140a and 140b, in which case transmitters 120a and 120b convert the power from power supplies 130a and 130b into time-varying electric fields. Embodiments that use inductive and/or capacitive coupling may be particularly suited for power transmission over short distances (i.e., near-field transmission). For power transmission over longer distances (i.e., far-field transmission), transmitters 120a and 120b may convert the power from power supplies 130a and 130b into electromagnetic radiation such as microwave radiation, visible light, infrared radiation, and/or the like.

Receivers 140a and 140b convert the time-varying electromagnetic fields received from transmitters 120a and 120b into electrical power (e.g., AC and/or DC power), which is then delivered via connections 145a and 145b to devices 150a and 150b. Devices 150a and 150b may include virtually any electronic device. According to some embodiments, devices 150a and 150b may be mobile devices such as smartphones, smart watches, tablet computers, laptop computers, and/or the like. Devices 150a and 150b may include energy storage components such as batteries for storing the received power and/or may consume the received power as it is received. Devices 150a and 150b may include one or more loads for consuming the received power and/or may include repeaters for transmitting the received power to another device. Receivers 140a and 140b and/or devices 150a and 150b may include sensor and/or control circuitry for measuring the attributes of the received power and providing feedback signals to controller 110 to adjust the characteristics of the transmitted power. The feedback signals may be conveyed to controller 110 by any suitable mechanism, such as using backscatter communication to embed the feedback signal in the time-varying electromagnetic field carrying the transmitted wireless power.

Figure 1B:
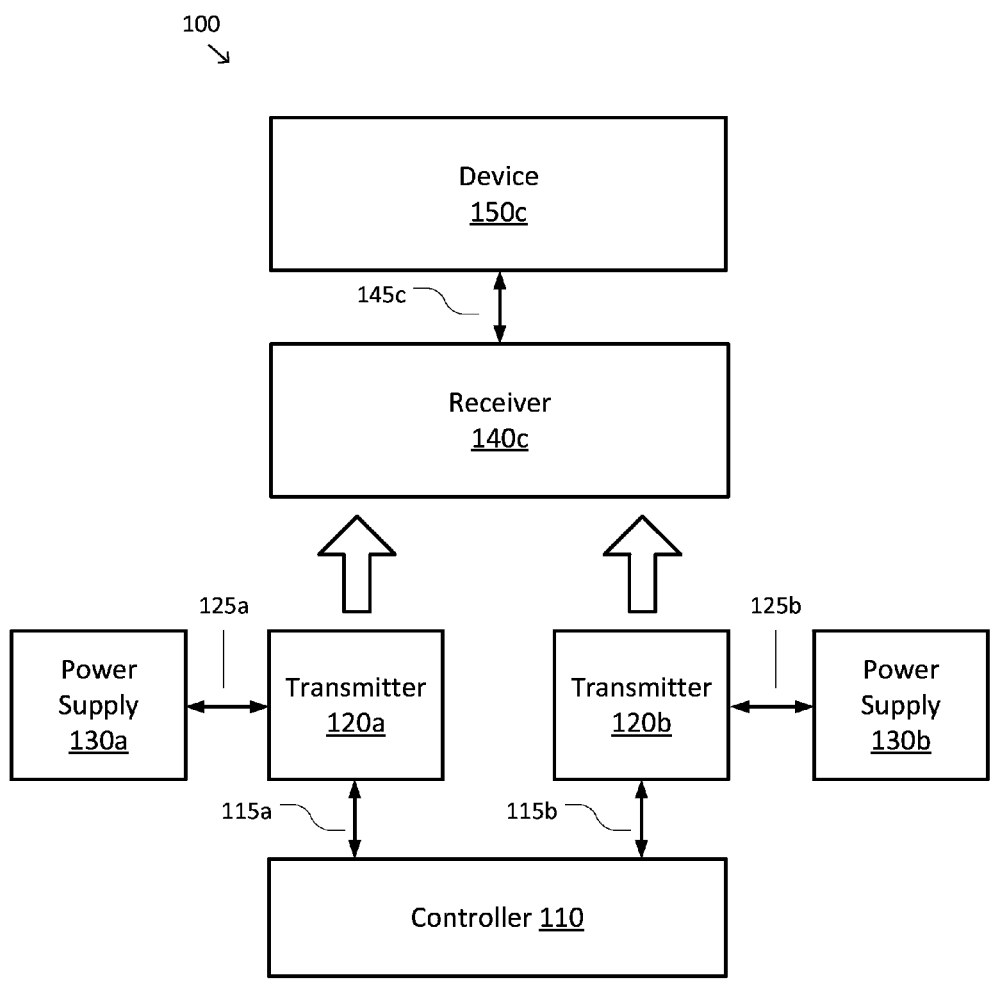
FIG. 1b is a simplified diagram of a wireless power transfer system in a one-receiver configuration according to some embodiments.

FIG. 1b is a simplified diagram of a wireless power transfer system 100 in a one-receiver configuration according to some embodiments. The one-receiver configuration depicted in FIG. 1b shares many features with the two-receiver configuration depicted in FIG. 1a. However, instead of using a pair of receivers 140a and 140b to receive power from transmitters 120a and 120b, the one-receiver configuration has a single receiver 140c and device 150c. Receiver 130c is configured to concurrently receive power from each of transmitters 120a and 120b.

In the one-receiver configuration of wireless power transfer system 100, the total amount of transmitted power received by receiver 130c is the sum of the transmitted power from each of transmitters 120a and 120b. As discussed previously with respect to FIG. 1a, the amount of transmitted power from each transmitter is proportional to the square of the supply voltage of the transmitter. As a result, the total amount of transmitted power is proportional to the sum of squares of the supply voltages of transmitters 120a and 120b. Although this linear increase in the total amount of transmitted power may be useful for some applications, other applications may benefit from a larger, non-linear increase in the total amount of transmitted power when switching from a two-receiver to a one-receiver configuration. For example, it would be desirable to achieve a non-linear increase proportional to the squared sum of the supply voltages of transmitters 120a and 120b. Such a non-linear increase in the total amount of transmitted power may enable a wireless power transfer system to support higher power electronic devices and/or faster charging of battery-powered electronic device. However, according to some examples, wireless power transfer system 100 as depicted in FIGS. 1a and 1b may be unable to provide the desired non-linear increase in the total amount of transmitted power when switching from the two-receiver to the one-receiver configuration.

Figure 2A:
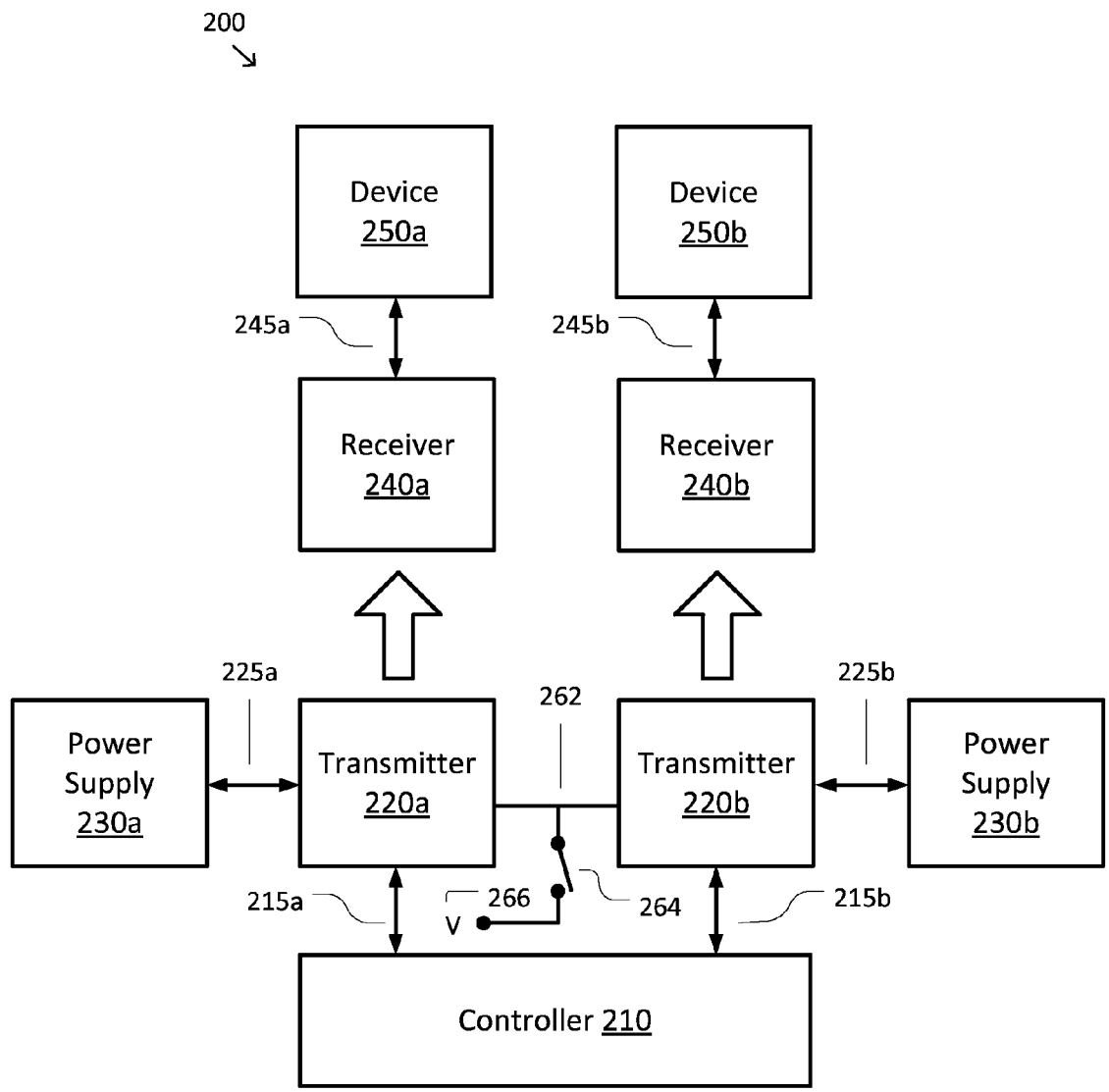
FIG. 2a is a simplified diagram of a switchable wireless power transfer system in a two-receiver configuration using a two half-bridge mode according to some embodiments.

FIG. 2a is a simplified diagram of a switchable wireless power transfer system 200 in a two-receiver configuration using a two half-bridge mode according to some embodiments. Switchable wireless power transfer system 200 is adapted to provide a non-linear increase in the total amount of transmitted power when switching between a two-receiver and one-receiver configuration.

Like wireless power transfer system 100, switchable wireless power transfer system 200 includes a controller 210 coupled via connections 215a and 215b to a pair of transmitters 220a and 220b. Transmitters 220a and 220b are further coupled via connections 225a and 225b to power supplies 230a and 230b. Transmitters 220a and 220b convert power from power supplies 230a and 230b into electromagnetic fields for wireless transmission. As depicted in FIG. 2a, a pair of receivers 240a and 240b receive the wirelessly transmitted power from transmitters 220a and 220b, respectively. Receivers 240a and 240b deliver the received power over connections 245a and 245b to a pair of devices 250a and 250b. These components generally correspond to similar components described above with respect to FIG. 1a.

Unlike wireless power transfer system 100, switchable wireless power transfer system 200 further includes an electrical connector 262 coupled through a switch 264 to a rail 266. Electrical connector 262 is coupled between transmitters 220a and 220b. Switch 264 may include a field effect transistor (FET), mechanical switch, and/or the like. In the two-receiver configuration of switchable wireless power transfer system 200, as depicted in FIG. 2a, switch 264 is closed, thereby coupling electrical connector 262 to rail 266. According to some embodiments, rail 266 may be configured to provide a predetermined voltage level. For example, rail 266 may be configured as a ground rail, supply rail, and/or the like. Accordingly, when switch 264 is closed, the voltage level of electrical connector 262 is pinned at the predetermined voltage level of rail 266. Because the voltage level of electrical connector 262 is pinned and does not convey a voltage signal between transmitters 220a and 220b, transmitters 220a and 220b are effectively decoupled and may be operated independently of one another. When switch 264 is closed and transmitters 220a and 220b are operated independently of one another, switchable wireless power transfer system 200 is said to be using a two half-bridge mode.

Figure 2B:
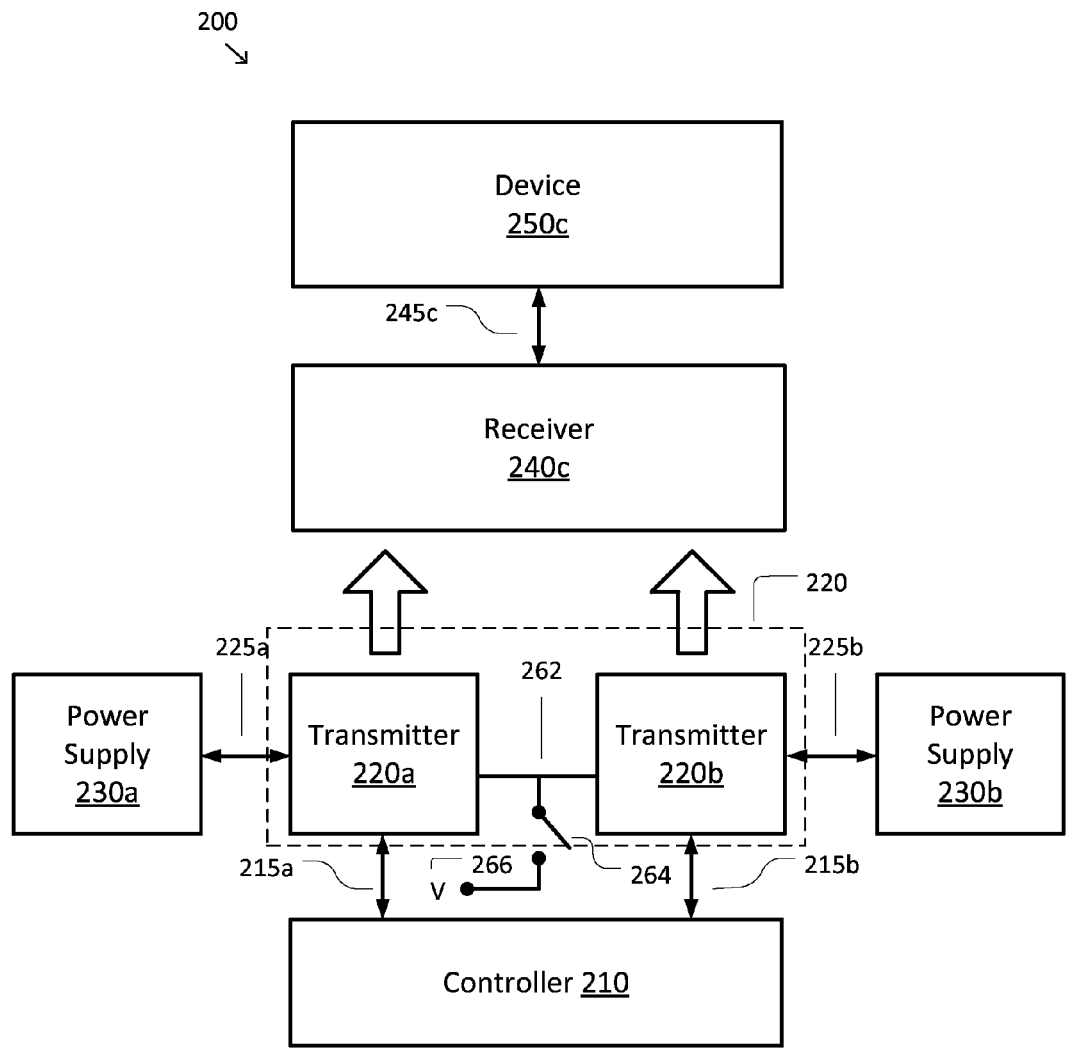
FIG. 2b is a simplified diagram of a switchable wireless power transfer system in a one-receiver configuration using a one full-bridge mode according to some embodiments.

FIG. 2b is a simplified diagram of a switchable wireless power transfer system 200 in a one-receiver configuration using a one full-bridge mode according to some embodiments. The one-receiver configuration depicted in FIG. 2b shares many features with the two-receiver configuration depicted in FIG. 2a. However, instead of using a pair of receivers 240a and 240b to receive power from transmitters 220a and 220b, the one-receiver configuration has a single receiver 240c and device 250c. Receiver 230c is configured to receive power from each of transmitters 220a and 220b. These components generally correspond to similar components described above with respect to FIG. 1b.

In the one-receiver configuration of wireless power transfer system 200, as depicted in FIG. 2b, switch 264 is open, thereby decoupling electrical connector 262 from rail 266. Accordingly, when switch 264 is open, the voltage level of electrical connector 262 conveys a time-varying signal between transmitters 220a and 220b. More specifically, electrical connector 262 is configured to allow transmitters 220a and 220b to operate as a combined transmitter 220. In the one full-bridge mode, the effective supply voltage across combined transmitter 220 is the sum of the supply voltages provided by voltage supplies 230a and 230b. As discussed previously with respect to FIG. 1a, the amount of transmitted power from a transmitter is proportional to the square of the supply voltage of the transmitter. As a result, the total amount of power transmitted by combined transmitter 220 is proportional to the squared sum of the supply voltages of transmitters 220a and 220b. The squared sum of the supply voltages is greater than the sum of squares of the supply voltages by up to a factor of two when each of the supply voltages of transmitters 220a and 220b are the same. When switch 264 is open and transmitters 220a and 220b operate as combined transmitter 220, switchable wireless power transfer system 200 is said to be using a one full-bridge mode.

According to some embodiments, another advantage of the switchable wireless power transfer system 200 is that, when each of transmitters 220a and 220b have a resonant frequency, the resonant frequency of combined transmitter 220 may be a frequency between the resonant frequencies of transmitters 220a and 220b. As a result, when the resonant frequencies of transmitters 220a and 220b are the same, the resonant frequency of combined transmitter 220 is also the same. Retaining a particular resonant frequency in both the two half-bridge and one full-bridge modes may be beneficial, for example, when the switchable wireless transfer system 200 is configured to conform to a standard that specifies a transmitter resonant frequency. Moreover, when the resonant frequencies of transmitters 220a and 220b are different, the resonant frequency of combined transmitter 220 may be an intermediate frequency between the two resonant frequencies, thereby allowing switchable wireless transfer system 200 to provide up to three distinct resonant frequencies, for example, to comply with up to three standards that specify different transmitter resonant frequencies. According to some examples, the resonant frequencies of one or both of transmitters 220a and 220b may be 100 kHz. According to some examples, the resonant frequencies of one or both of transmitters 220a and 220b may be 200 kHz.

As discussed above and further emphasized here, FIGS. 2a and 2b are merely examples which should not unduly limit the scope of the claims. One of ordinary skill in the art would recognize many variations, alternatives, and modifications. According to some embodiments, the circuit formed by electrical connection 262, switch 264, and rail 266 may be modified and/or rearranged while retaining similar functionality to the embodiment described above. For example, instead of coupling switch 264 between electrical connection 262 and rail 266, switch 264 may be coupled between transmitters 220a and 220b and may be open in the two half-bridge mode and closed in the one full-bridge mode. In furtherance of this embodiment, additional switches may be coupled between each of transmitters 220a and 220b and rail 266 that are closed in the two half-bridge mode and open in the one full-bridge mode.

Although the two half-bridge mode is identified as being used in the two-receiver configuration and the one full-bridge mode is identified as being used in the one-receiver configuration, these correspondences are merely illustrative. In some embodiments, the two half-bridge mode may be used in the one-receiver configuration and the one full-bridge mode may be used in the two-receiver configuration. Furthermore, in some embodiments, switchable wireless power transfer system 200 may include three or more receivers.

Some embodiments of switchable wireless power transfer system 200 may include various components and/or connections between components that are not shown in FIG. 2a or 2b. In some embodiments, controller 210 may provide one or more control signals to switch 262 and/or power supplies 130a and 130b through additional connections not shown in FIG. 2a or 2b. According to some embodiments, power supplies 230a and 230b may be coupled to each other and/or may be provided by the same power supply unit. According to some embodiments, switchable wireless power transfer system 200 may include a modulator and/or a demodulator for transmitting and receiving backscatter communications from a device/receiver to controller 210. According to some embodiments, switchable wireless power transfer system 200 may include other types of communication modules for communications between the devices/receivers and controller 210, such as a Bluetooth controller, Near Field Communication (NFC) controller, and/or the like. According to some examples, devices/receivers and controller 210 may communicate by wired communication, such as Ethernet-based communication, even when power is being transmitted wirelessly.

Figure 3:
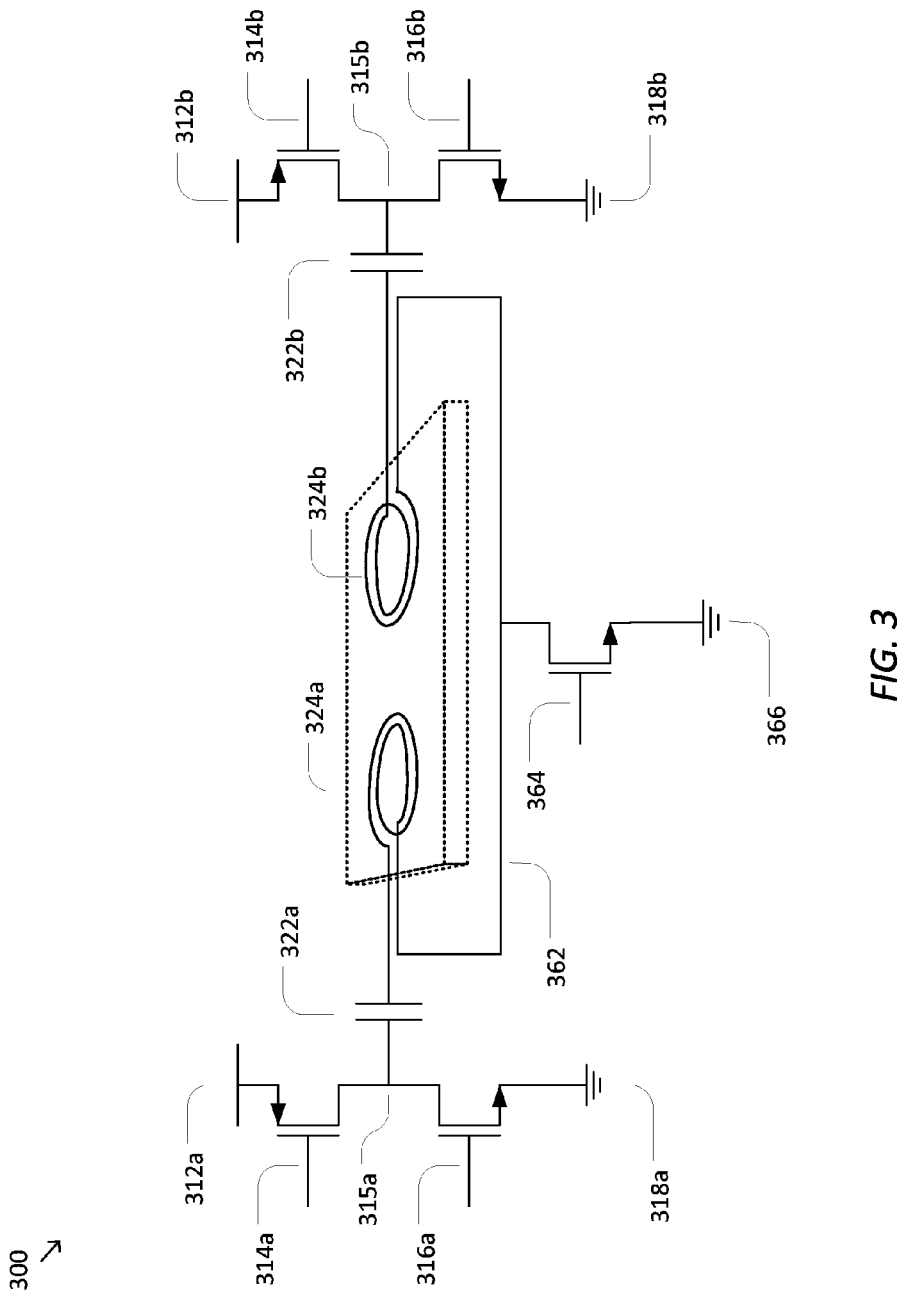
FIG. 3 is a simplified diagram of a switchable wireless power transmitter configured for two half-bridge to one full-bridge switchover according to some examples.

FIG. 3 is a simplified diagram of a switchable wireless power transmitter 300 configured for two half-bridge to one full-bridge switchover according to some examples. According to some embodiments, portions of switchable wireless power transfer system 200 may be implemented using switchable wireless power transmitter 300.

Switchable wireless power transmitter 300 includes a pair of driver circuits and a pair of resonant circuits. In general, the driver circuits generate oscillating drive signals with a configurable frequency, amplitude, and phase. As depicted in FIG. 3, the driver circuits include supply nodes 312a and 312b, pull-up switches 314a and 314b coupled between the supply nodes 312a and 312b and output nodes 315a and 315b, and pull-down switches 316a and 316b coupled between the output nodes 315a and 315b and ground nodes 318a and 318b. Switches 314a and 316a are driven to provide an oscillating drive signal at output node 315a. Similarly, switches 314a and 316a are driven to provide an oscillating drive signal at output node 315b. In some examples, the oscillating drive signals at nodes 315a and 315b have a frequency and/or phase determined by a controller driving switches 314a, 314b, 316a, and 316b. In general, the resonant circuits convert the oscillating drive signals into a time-varying electromagnetic fields for wireless power transfer. As depicted in FIG. 3, the resonant circuits are configured as series LC tank circuits in which capacitors 322a and 322b are coupled in series with inductors 324a and 324b, respectively. The inductors 324a and 324b are configured to convert oscillating electrical currents into time-varying magnetic fields for wireless power transmission. The resonant circuits are each associated with a resonant frequency determined based on a product of the capacitance C of the capacitors 322a and 322b and the inductance L of the inductors 324a and 324b. According to some embodiments, one or both of the resonant circuits may have a resonant frequency of 100 kHz. According to some embodiments, one or both of the resonant circuits may have a resonant frequency of 200 kHz. The resonant circuits are coupled between the output nodes 315a and 315b and connector node 362. Connector node 362 is further coupled through switch 364 to ground node 366.

According to some embodiments, one or more of the pull-up switches 314a and 314b, pull-down switches 316a and 316b, and/or switch 364 may include field effect transistors (FETs), each FET having a gate, source, and drain. In furtherance of such embodiments, the source and drain of each FET may be coupled between the various nodes of switchable wireless power transmitter 300 as described above. The gate of each FET may be coupled to a corresponding control signal. According to some examples, the control signals associated with pull-up switches 314a and 314b and pull-down switches 316a and 316b may determine the frequency and phase of the corresponding oscillating drive signals, while the amplitude of the oscillating drive signals may be determined based on the respective voltage difference between the supply nodes 312a and 312b and ground nodes 318a and 318b.

According to some embodiments, the voltage difference between the supply nodes 312a and 312b and ground nodes 318a and 318b may be substantially fixed during normal operation. Thus, the amplitude of the oscillating drive signals may be substantially constant. In order to control the amount of power transmitted by the resonant circuits, the frequency of the oscillating drive signals relative to the resonant frequencies of the resonant circuits may be adjusted. For example, maximum power transmission may be achieved when the frequencies of the oscillating drive signals coincide with the resonant frequencies of the resonant circuits. The power transmission may be reduced by shifting the frequencies of the oscillating drive signals away from the resonant frequencies. The amount of power transmission in such embodiments is proportional to the square of the supply voltages and is further determined based on the frequency of the oscillating drive signals.

In a two half-bridge mode, switch 364 is closed and the resonant circuits are driven independently. That is, the oscillating drive signals at output nodes 315a and 315b are not synchronized with one another. In some embodiments, a period of the oscillating drive signal may include a pull-up time window, in which the pull-up switch is closed and the pull-down switch is open, and a pull-down time window, in which the pull-up switch is open and the pull-down switch is closed. During the pull-up time window, the voltage applied across the resonant circuit is proportional to the supply voltage, as a circuit is formed between supply node 312a or 312b and ground node 366. During the pull-down time window, no voltage is applied across the resonant circuit, as the circuit formed between ground node 318a or 318b and ground node 366 does not include any supply node. In some examples, the maximum amount of power supplied by each of the drive circuit/resonant circuit pairs is 5 W in the two half-bridge mode. Thus, the maximum total amount of power supplied is 10 W.

In a one full-bridge mode, switch 364 is opened and the oscillating drive signals oscillate synchronously with the same frequency and opposite phase. As in the two half-bridge mode, a period of the oscillating drive signal may include a pull-up time window in which the pull-up switch is closed and the pull-down switch is open, and a pull-down time window in which the pull-up switch is open and the pull-down switch is closed. However, because the oscillating drive signals are synchronized, whenever one of the drive circuits is in the pull-up configuration, the other oscillating drive signal is in the pull-down configuration and vice versa. During a first time window, pull-up switch 314a and pull-down switch 316b are closed, forming a circuit between supply node 312a and ground node 318b. Accordingly, the supply voltage is applied across both resonant circuits from left-to-right. During a second time window, pull-down switch 316a and pull-up switch 314b are closed, forming a circuit between supply node 312b and ground node 318a. Accordingly, the supply voltage is applied across both resonant circuits from left-to-right. The total voltage swing across both resonant circuits when cycling between the first and second time window of the oscillation period is twice the supply voltage (or the sum of the voltages at supply nodes 312a and 312b when the voltages are different). Thus, the amount of transmitted power is the squared sum of the supply voltages. According to some examples, when the maximum power transmission of each resonant circuit is 5 W in the two half-bridge mode (10 W total), as discussed above, the maximum power transmission of the combined resonant circuit is 20 W in the one full-bridge mode.

As discussed above, the resonant circuits are associated with resonant frequency determined based on a product of the capacitance C of the capacitors 322a and 322b and the inductance L of the inductors 324a and 324b. In the one full-bridge mode, the two capacitors 322a and 322b and the two inductors 324a and 324b form a series circuit. An illustrative embodiment where capacitors 322a and 322b have the same capacitance and inductors 324a and 324b have the same inductance is discussed below. The capacitance of two capacitors in series is half the capacitance of each of the capacitors individually. The inductance of two inductors in series is twice the inductance of the two inductors individually. When the capacitance is halved and the inductance is doubled, the product of the inductance and the capacitance remains unchanged. Accordingly, the resonant frequency of the combined resonant circuit is the same as the resonant frequencies of the resonant circuits individually.

As discussed above and further emphasized here, FIG. 3 is merely an example which should not unduly limit the scope of the claims. One of ordinary skill in the art would recognize many variations, alternatives, and modifications. According to some embodiments, the circuit depicted in FIG. 3 may be modified and/or rearranged while retaining similar functionality to the embodiment described above. According to some embodiments, capacitors 322a and 322b and/or inductors 324a and 324b may include variable capacitors and/or variable inductors, respectively. More generally, the resonant circuits may include tunable resonant circuits. According to some embodiments, the drive circuits may be implemented using any circuit design suitable for generating the oscillating drive signal. In some embodiments, one or more of the pull-up switches 314a and 314b and/or pull-down switches 316a and 316b may be substituted with diodes. According to some examples, one or more of the pull-up switches 314a and 314b and/or pull-down switches 316a and 316b may include analog switches configurable to control the amplitude of the drive signal in addition to the frequency and phase. According to some examples, the oscillating drive signals may include additional configurable parameters such as duty cycle and/or pulse width modulation (PWM) waveform. In some examples, the duty cycle and/or PWM waveform of the oscillating drive signals may be varied in time in order to control the amount of power transmitted by the resonant circuits.

Figure 4:
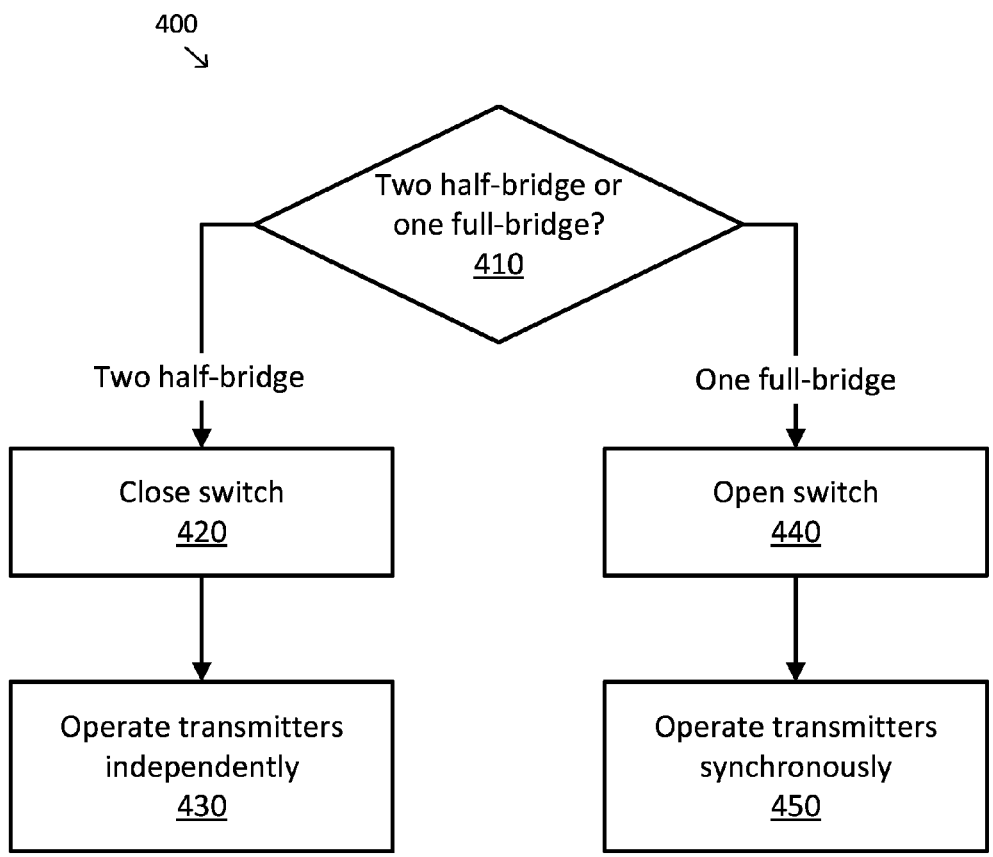
FIG. 4 is a simplified diagram showing a method of wireless power transmission using two half-bridge to one full-bridge switchover according to some embodiments.

FIG. 4 is a simplified diagram of a method 400 of wireless power transmission using two half-bridge to one full-bridge switchover according to some embodiments. According to some embodiments, a wireless power transfer system that includes a wireless power transmitter having a two half-bridge and one full-bridge mode, such as switchable wireless power transfer system 200 and/or switchable wireless power transmitter 300, may perform method 400 when switching between the two half-bridge and one full-bridge modes of the wireless power transmitter. In some embodiments, a controller, such as controller 210, may perform portions of method 400.

At a process 410, it is determined whether the two half-bridge mode or one full-bridge mode is to be used. According to some embodiments, determining the mode may depend upon information communicated between the controller and one or more devices/receivers, such as devices 250a-c and/or receivers 240a-c. According to some embodiments, determining the mode may depend upon a user input to the wireless power transmitter, the user input being provided through a local (e.g. a mechanical switch) and/or remote (e.g. web-based) interface. In some examples, determining the mode may be made based on the number and/or types of devices/receivers configured to receive wirelessly transmitted power at a given time. In some examples, some devices/receivers that are compatible with the wireless power transmitters may include low power devices/receivers, such as 5 W devices/receivers. Exemplary low power devices/receivers may include small portable electronics such as smartphones, music players, and/or the like. Other devices/receivers that are compatible with the wireless power transmitters may be high power devices/receivers, such as 20 W devices/receivers. Exemplary high power devices/receivers may include large portable electronics such as tablet and/or laptop computers. According to some embodiments, when the wireless power transmitter sends power to one or more low power devices/receivers, the two half-bridge mode may be selected. When the wireless power transmitter sends power to a single high power devices/receivers, the one full-bridge mode may be selected.

When it is determined at process 410 that the two half-bridge mode is to be used, method 400 proceeds to processes 420 and 430 for configuring the two half-bridge mode. When it is determined at process 410 that the one full-bridge mode is to be used, method 400 proceeds to process 440 and 450 for configuring the one full-bridge mode.

At a process 420, a switch is closed. According to some embodiments, the switch may correspond to switch 264 and/or switch 364 described previously with respect to FIGS. 2a-b and 3. Accordingly, closing the switch may result in a pair of transmitters, such as transmitters 220a and 220b, and/or resonant circuits, that are coupled to each other through a connection, such as electrical connector 262 and/or connector node 364, being effectively decoupled from one another. The transmitters are effectively decoupled when the switch is closed because the closed switch forms a short circuit between the connection and a node with a fixed voltage, such as rail 266 and/or ground node 366. Thus, the connection does not convey a voltage signal between the transmitters.

At a process 430, the transmitters are operated independently. According to some embodiments, operating the transmitters independently may include sending control signals to the transmitter to control the characteristics of the transmitted power. In some embodiments consistent with FIG. 3, the control signals may determine the amplitude, frequency, and/or phase of an oscillating drive signal to a resonant circuit. During independent operation, the amplitudes, frequencies, and/or phases of the oscillating drive signals corresponding to each of the transmitters may or may not be the same as one another. Accordingly, during independent operation, the power transmitted by each transmitter may be tuned according to different devices/receivers associated with each transmitter independent of the other transmitter.

Alternately, when it is determined at process 410 that the one full-bridge mode is to be used, method 400 proceeds to process 440 and 450 for configuring the one full-bridge mode. At a process 440, the switch is opened. In some embodiments consistent with FIGS. 2a-b and 3, opening the switch may result in the pair of transmitters operating as a combined transmitter. The transmitters are combined when the switch is opened because opening the switch removes the short circuit between the connection and the fixed voltage formed by closing the switch. Thus, the connection conveys a voltage signal between the transmitters causing the transmitters to operate as a combined transmitter.

At a process 430, the combined transmitter is operated synchronously. According to some embodiments, operating the combined transmitters synchronously may include sending control signals to the combined transmitter to control the characteristics of the transmitted power. In some embodiments consistent with FIG. 3, the control signals may determine the amplitude, frequency, and/or phase of an oscillating drive signal to the resonant circuits of the combined transmitter. During synchronized operation, the oscillating drive signals provided by each of the drive circuits may have the same frequency and opposite phase relative to one another. Accordingly, as discussed previously with respect to FIG. 3, during synchronized operation the voltage swing across the combined transmitter may correspond to a sum of the amplitudes of each of the oscillating drive signals. Thus, the power transmitted by the combined transmitters in the one full-bridge mode may be proportional to the squared sum of the amplitudes of the oscillating drive signals.

As discussed above and further emphasized here, FIG. 4 is merely an example which should not unduly limit the scope of the claims. One of ordinary skill in the art would recognize many variations, alternatives, and modifications. According to some embodiments, one or more of processes 430 and 450 may be performed before, concurrently with, and/or after processes 420 and 440, respectively. According to some embodiments, method 400 may include additional processes that are not shown in FIG. 4. According to some embodiments, as discussed previously with respect to FIG. 2a, some examples of the circuit including the switch may be rearranged such that the switch is opened during process 420 and closed during process 440.

Some examples of controllers, such as controller 110 may include non-transient, tangible, machine readable media that include executable code that when run by one or more processors may cause the one or more processors to perform the processes of method 400. Some common forms of machine readable media that may include the processes of method 400 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A wireless power transfer system comprising:
a controller;
first and second transmitters coupled to the controller, the first and second transmitters being coupled to one another by an electrical connection; and
a switch coupled between the electrical connection and a voltage rail;
wherein:
when the switch is closed, the controller operates the first and second transmitters in a two half-bridge mode; and
when the switch is open, the controller operates the first and second transmitters in a one full-bridge mode.

2. The wireless power transfer system of claim 1, wherein first and second supply voltages are provided to the first and second transmitters, respectively.

3. The wireless power transfer system of claim 2, wherein:
in the two half-bridge mode, a total amount of power transmitted by the first and second transmitters is determined based on a sum of squares of the first and second supply voltages; and
in the one full-bridge mode, the total amount of power transmitted by the first and second transmitters is determined based on a squared sum of the first and second supply voltages;
wherein the squared sum is greater than the sum of squares.

4. The wireless power transfer system of claim 1, wherein the first and second transmitters have first and second resonant frequencies, respectively.

5. The wireless power transfer system of claim 4, wherein:
in the two half-bridge mode, the first and second transmitters transmit power at the first and second resonant frequencies, respectively; and
in the one full-bridge mode, the first and second transmitters transmit power at a combined resonant frequency between the first and second resonant frequencies.

6. The wireless power transfer system of claim 5, wherein each of the first, second, and combined resonant frequencies are substantially the same frequency.

7. The resonant power transfer system of claim 5, wherein one or more of the first, second, and combined resonant frequencies are 100 kHz.

8. The resonant power transfer system of claim 5, wherein one or more of the first, second, and combined resonant frequencies are 200 kHz.

9. A wireless power transfer circuit comprising:
a first resonant circuit configured for wireless power transfer;
a first driver circuit configured to drive the first resonant circuit with a first drive signal, the first drive signal having a first frequency, amplitude, and phase;
a second resonant circuit configured for wireless power transfer;
a second driver circuit configured to drive the second resonant circuit with a second drive signal, the second drive signal having a second frequency, amplitude, and phase;
an electrical connector coupling the first and second resonant circuits; and
a switch coupled between the electrical connector and a first rail;
wherein:
when the switch is closed, the wireless power transfer circuit operates in a two half-bridge mode; and
when the switch is open, the wireless power transfer circuit operates in a one full-bridge mode.

10. The wireless power transfer circuit of claim 9, wherein:
in the two half-bridge mode, the first and second drive signals are independent;
in the one full-bridge mode, the first and second drive signals have the same frequency and the opposite phase.

11. The wireless power transfer circuit of claim 9, wherein the first and second resonant circuits are configured as series LC tank circuits.

12. The wireless power transfer circuit of claim 9, wherein the first and second resonant circuits each include an inductor coil configured for wireless power transmission.

13. The wireless power transfer circuit of claim 9, wherein the first and second driver circuits each include:
a first field effect transistor (FET) having a first gate, source, and drain, the first gate being coupled to a first control signal, and the first source and drain being coupled between a supply node and an output node; and a second FET having a second gate, source, and drain, the second gate being coupled to a second control signal, and the second source and drain being coupled between the output node and a ground node;

wherein an oscillating electrical signal at the output node has a frequency and a phase determined based on the first and second control signals and an amplitude determined based on a voltage difference between the supply node and the ground node, the oscillating electrical signal at the output node corresponding to the first and second drive signals.

14. The wireless power transfer circuit of claim 9, wherein the first and second resonant circuits each have a resonant frequency.

15. The wireless power transfer circuit of claim 14, wherein the resonant frequency of one or both of the first and second resonant circuits is 100 kHz.

16. The wireless power transfer circuit of claim 14, wherein the resonant frequency of one or both of the first and second resonant circuits is 200 kHz.

17. The wireless power transfer circuit of claim 14, wherein the resonant frequencies of the first and second resonant circuits are substantially the same.

18. The wireless power transfer circuit of claim 14, wherein:

in the two half-bridge mode, a total amount of power transmitted by the wireless power transfer circuit is determined based on a sum of squares of the first and second amplitudes; and in the one full-bridge mode, the total amount of power transmitted by the first and second transmitters is determined based on a squared sum of the first and second amplitudes;

wherein the squared sum is greater than the sum of squares.

19. The wireless power transfer circuit of claim 18, wherein the total amount of power transmitted by the wireless power transfer circuit is further determined based on differences between the frequencies of the first and second drive signals and the resonant frequencies of the resonant circuits.

20. A method for switching between a two half-bridge mode and a one full-bridge mode during wireless power transfer, the method comprising:

when switching to the two half-bridge mode:
closing a switch coupled between an electrical connector between two wireless power transmitters and a ground node; and
independently controlling the two wireless power transmitters; and when switching to the one full-bridge mode:
opening the switch, causing the two wireless power transmitters to operate as a combined transmitter; and
synchronously controlling the combined transmitter.

* * * * *